(12) United States Patent
Jean et al.

(10) Patent No.: US 9,379,527 B2
(45) Date of Patent: Jun. 28, 2016

(54) STRINGING MESSENGER CLAMP AND METHODS OF USING THE SAME

(71) Applicant: Marmon Utility, LCC, Milford, NH (US)

(72) Inventors: Leonard P. Jean, Melbourne, FL (US); Brian Boisclair, Goffstown, NH (US); Jared Argyle, Amherst, NH (US); Bob Biddle, Amherst, NH (US); Edward Laughlin, Lowell, MA (US); Javier Philbrick, Nashua, NH (US)

(73) Assignee: MARMON UTILITY, LLC, Milford, NH (US)

( * ) Notice: Subject to any disclaimer, the term of this patent is extended or adjusted under 35 U.S.C. 154(b) by 384 days.

(21) Appl. No.: 13/768,597

(22) Filed: Feb. 15, 2013

(65) Prior Publication Data

US 2013/0214220 A1 Aug. 22, 2013

Related U.S. Application Data

(60) Provisional application No. 61/601,801, filed on Feb. 22, 2012.

(51) Int. Cl.
| | | |
|---|---|---|
| *H01B 17/00* | (2006.01) | |
| *B65H 59/00* | (2006.01) | |
| *H02G 1/04* | (2006.01) | |
| *H02G 7/22* | (2006.01) | |

(52) U.S. Cl.
CPC ... *H02G 1/04* (2013.01); *H02G 7/22* (2013.01)

(58) Field of Classification Search
CPC ....................................... H02G 1/02

USPC ................ 254/134.3 R, 134.3 PA, 134.3 CL; 403/83, 112

See application file for complete search history.

(56) References Cited

U.S. PATENT DOCUMENTS

| | | | | |
|---|---|---|---|---|
| 1,170,725 A | * | 2/1916 | Austin | .......................... 174/144 |
| 1,305,713 A | * | 6/1919 | Goodard | ..................... 24/135 R |
| 1,794,998 A | * | 3/1931 | Weinberger | ..................... 248/63 |
| 2,590,645 A | * | 3/1952 | Petersen | ....................... 254/405 |
| 2,946,559 A | * | 7/1960 | Pickett | .................. 254/134.3 PA |
| 3,129,917 A | | 4/1964 | Huggins | |
| 3,146,994 A | * | 9/1964 | Sherman | ................ 254/134.3 R |
| 3,568,968 A | | 3/1971 | Taylor | |
| 3,592,426 A | | 7/1971 | Dubey | |
| 3,596,878 A | | 8/1971 | Parsen | |
| 3,706,436 A | * | 12/1972 | Lindsey | .......................... 248/63 |
| 3,719,770 A | | 3/1973 | Richardson, Jr. | |
| 3,756,160 A | | 9/1973 | Kahl | |
| 3,824,835 A | | 7/1974 | Jackson | |

(Continued)

FOREIGN PATENT DOCUMENTS

JP       2007215312 A       8/2007

*Primary Examiner* — Joseph J Hail
*Assistant Examiner* — J Stephen Taylor
(74) *Attorney, Agent, or Firm* — Hayes Soloway, P.C.

(57) ABSTRACT

A stringing messenger clamp for use in overhead transmission and distribution systems and method of installing a messenger cable is provided. The stringing messenger clamp includes a bracket and an assembly body supported by the bracket, wherein the assembly body has a cable channel sized to receive a portion of a messenger cable. An assembly clamp is movable with respect to the assembly body and closable upon the cable channel. When the assembly clamp is in a closed position, it retains in place the portion of the messenger cable within the cable channel.

17 Claims, 10 Drawing Sheets

(56) References Cited

U.S. PATENT DOCUMENTS

| | | |
|---|---|---|
| 3,908,962 A | 9/1975 | Ross |
| 4,032,212 A * | 6/1977 | Faust .................. H01R 4/2408 439/412 |
| 4,178,470 A * | 12/1979 | Jean et al. ...................... 174/168 |
| 4,260,848 A | 4/1981 | Amaya |
| 4,526,428 A | 7/1985 | Sachs |
| 4,832,442 A | 5/1989 | Pappas |
| 4,960,266 A | 10/1990 | McDowell et al. |
| 5,064,172 A | 11/1991 | Hereford |
| 5,195,704 A | 3/1993 | Louie |
| 5,228,657 A | 7/1993 | Hall |
| 5,593,327 A | 1/1997 | Hlinsky et al. |
| 5,599,005 A | 2/1997 | Sauber |
| 5,639,068 A | 6/1997 | Johnson |
| 6,142,434 A | 11/2000 | Trost et al. |
| 6,204,445 B1 | 3/2001 | Gialenios et al. |
| 6,382,385 B2 * | 5/2002 | Ransil ........................ 193/35 R |
| 6,595,477 B2 | 7/2003 | Roberts |
| 6,892,990 B2 * | 5/2005 | Pisczak ...................... 248/74.4 |
| 7,578,488 B2 * | 8/2009 | Kiser ...................... H02G 7/05 248/218.4 |
| 8,684,733 B2 * | 4/2014 | McBride .............. A61C 8/0053 433/173 |
| 2004/0084574 A1 | 5/2004 | Goodwin et al. |
| 2010/0018014 A1 | 1/2010 | Boisclair |

* cited by examiner

STRINGING MESSENGER CLAMP AND METHODS OF USING THE SAME

CROSS REFERENCE TO RELATED APPLICATION

This application claims benefit of U.S. Provisional Application Ser. No. 61/601,801, entitled, "Stringing Messenger Clamp and Methods of Using the Same" filed Feb. 22, 2012, the entire disclosure of which is incorporated herein by reference.

FIELD OF THE DISCLOSURE

The present disclosure is generally related to overhead transmission and distribution systems and more particularly is related to a stringing messenger clamp and methods of using the same for overhead transmission and distribution systems.

BACKGROUND OF THE DISCLOSURE

Overhead conductor cables are commonly suspended from a messenger wire. The messenger wire is supported on poles or towers with the conductor cable spacers arranged at spaced intervals along the messenger wire to suspend one or more conductor cables. A variety of devices may be used to either install the messenger cable or permanently retain the messenger cable. For example, during installation of the messenger cable, an installation device may be used to temporarily retain the messenger cable in place while it is strung along the utility poles, which is then exchanged for a permanent messenger cable retention device. These conventional installation processes are often tedious and expensive processes since they require the use of numerous different installation devices for installation, and then an exchanging of the installation devices for permanent retention devices. For example, a utility worker installing a cable will have to first install the installation devices, then string the messenger cable through the installation devices, and then go back to each of the installation devices and replace it with a permanent stringing device.

The installation devices and permanent retention devices that are used with a transmission and distribution line will depend on the location and setting of the area, including such things as curves in the line run and changes in elevation. Clamps of the messenger cable will be used for both straight runs of the messenger cable and those having curves, such as by changes in direction and/or elevation. However, these conventional clamps are often limited in how much of a variation in change in direction or elevation they can support. For example, a conventional clamps used for stringing and retaining messenger cable in substantially straight runs may only be capable of facilitating up to a 6° variation in the x, y, and z directions from a straight path. When a messenger cable run has a curve greater than 6°, the straight conventional clamp must be replaced with a different type of clamp, such as one that facilitates a variation of between 6° and 20°. The relative inflexibility of these conventional clamps to facilitate a greater number of variations adds to the expense and time of installation and retention of the messenger cable.

The use of these many installation and permanent retention components comes at a high cost to utility companies. These costs, coupled with the expense in man hours for installation of the cable adds significant costs to the operational budgets of the utility companies, which is passed along to the consumer in the form of higher utility bills. Furthermore, many of the cable retention devices conventionally used are designed for particular or specific uses, and may not be able to be used in universal positions. Thus, a worker must first make sure he or she has the correct device prior to installation. This adds additional complications to the installation process of cable, which adds more time and costs to the already high expense associated with stringing and retaining cable.

Thus, a heretofore unaddressed need exists in the industry to address the aforementioned deficiencies and inadequacies.

SUMMARY OF THE DISCLOSURE

Embodiments of the present disclosure provide a stringing messenger clamp for use in overhead transmission and distribution systems and related methods. Briefly described, in architecture, one embodiment of the apparatus, among others, can be implemented as follows. A stringing messenger clamp for use in overhead transmission and distribution systems includes a bracket and an assembly body supported by the bracket, wherein the assembly body has a cable channel sized to receive a portion of a messenger cable. An assembly clamp is movable with respect to the assembly body and closable upon the cable channel, wherein the assembly clamp in a closed position retains in place the portion of the messenger cable within the cable channel.

The present disclosure can also be viewed as providing methods of stringing and retaining a messenger cable. In this regard, one embodiment of such a method, among others, can be broadly summarized by the following steps: affixing a bracket to a utility holding structure; supporting an assembly body with the bracket, the assembly body having a cable channel; receiving a portion of the messenger cable within the cable channel; and closing an assembly clamp on the cable channel, thereby retaining the portion of the messenger cable within the cable channel, and holding the portion of the messenger cable for an indefinite period of use.

The present disclosure can also be viewed as providing methods of installing a messenger cable. In this regard, one embodiment of such a method, among others, can be broadly summarized by the following steps: affixing a messenger clamp to a utility pole with a bracket; adjusting a cable channel within the messenger clamp to linearly receive a portion of the messenger cable, wherein the adjusted cable channel is circumferentially closed thereby preventing radial displacement of the portion of the messenger cable within the cable channel; stringing the portion of the messenger cable through the cable channel, thereby placing the messenger cable in a retention position; locking the messenger cable in a stationary position within the cable channel; and supporting the messenger cable with the messenger clamp while the messenger cable is in use with a transmission and distribution cable.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
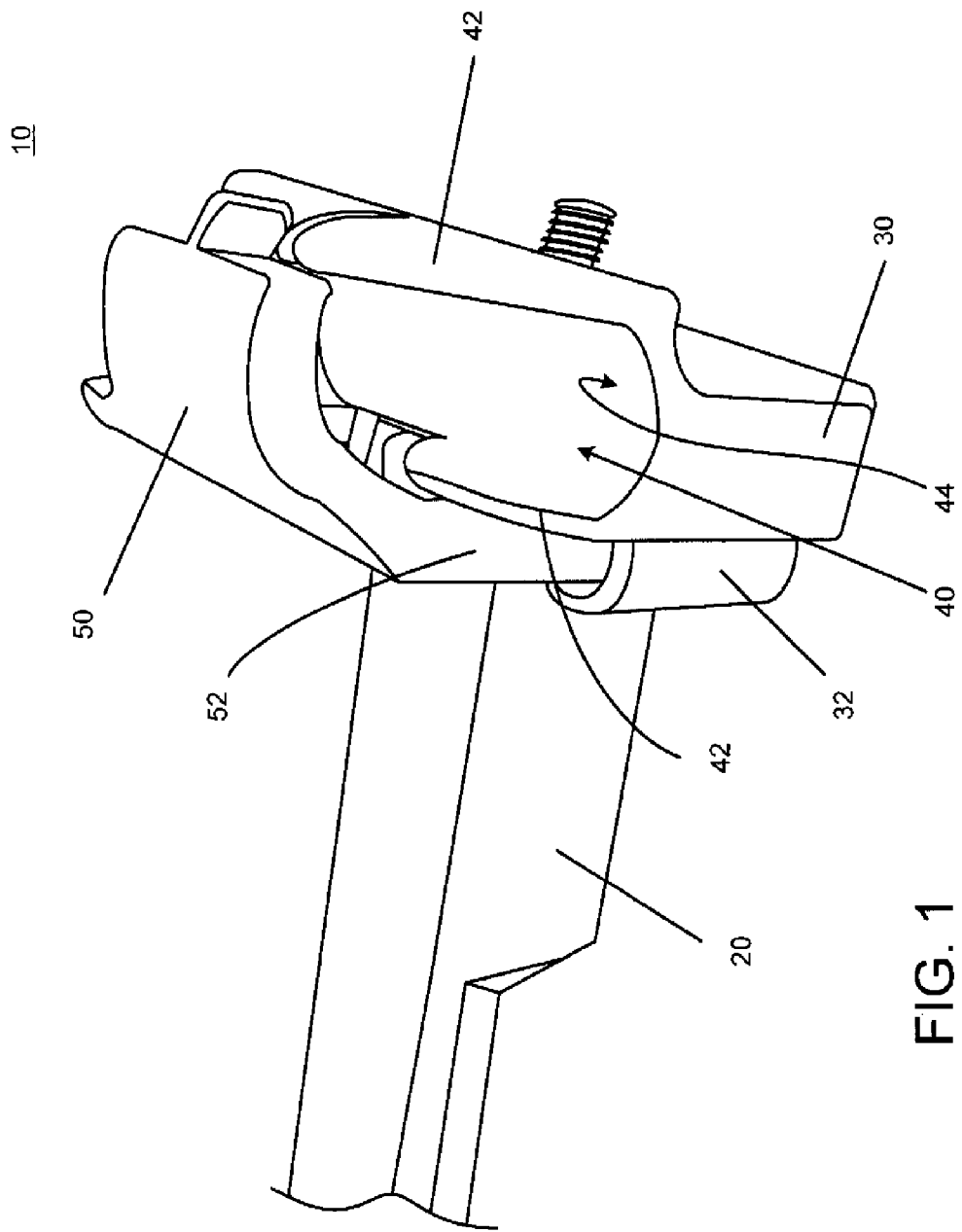
FIG. 1 is a plan view illustration of a stringing messenger clamp for use in overhead transmission and distribution systems, in accordance with a first exemplary embodiment of the present disclosure.

FIG. 1 is plan view illustration of a stringing messenger clamp 10 for use in overhead transmission and distribution systems, in accordance with a first exemplary embodiment of the present disclosure. The stringing messenger clamp 10 for use in overhead transmission and distribution systems, referred to herein simply as 'clamp 10' is used with any type of overhead transmission and distribution system, such as those used for carrying electrical conductor cables and communication lines. The clamp 10 includes a bracket 20 and an assembly body 30 supported by the bracket 20. The assembly body 30 has a cable channel 40 sized to receive a portion of a messenger cable. An assembly clamp 50 is movable with respect to the assembly body 30 and closable upon the cable channel 40, wherein the assembly clamp 50 in a closed position retains in place the portion of the messenger cable within the cable channel 40.

The clamp 10 is used with stringing and retaining a cable commonly used with utility transmission and distribution of electricity. The clamp 10 is used in connection with the messenger wire, which is known in the industry as a messenger cable or a catenary, and is a durable wire structure that is used to support cable, such as a conductor cable or transmission and distribution cables. The clamp 10 may be used during both the installation of the cable and to retain the cable in an installed position for an indefinite period of time, such as for the months or years the conductor cable may be in place. Conventional systems include those used to cable and those used to retain the cable in place for the indefinite period of time. However, since two devices are needed to complete installation, i.e., an installation device and a permanent retaining device, installing new cable is a costly and inefficient process. Conventionally, after the cable is strung through the conventional installation device, a utility worker must remove the installation device and replace it with a permanent retaining device. Ultimately, this increases the time and expense for installing cables.

The bracket 20 is used to support and hold the assembly body 30 and assembly clamp 50 in a position where they can retain a messenger cable. The bracket 20 may be sized and shaped in a variety of ways. For example, the bracket 20 may commonly include a beam shape that provides for rigid support of the assembly body 30 and assembly clamp 50. The bracket 20 may be permanently or removably connected to the assembly body 30 with a number of connection systems and designs. For example, as is discussed with respect to the second exemplary embodiment, the connection may be a ball and socket joint. Other connections may include welded joints, friction fit joints, joints with threaded and non-threaded fasteners, and may include shaped washers or surfaces. Of course, the bracket 20 may be integrally formed with the assembly body 30, thereby making the bracket 20 and the assembly body 30 a substantially unitary structure.

As is shown in FIG. 1, the assembly body 30 may be a structure block that engages with the bracket 20 and holds a cable channel 40. The assembly body 30 may hold the cable channel 40 in a variety of ways, such with a cable channel 40 being formed integrally within the assembly body (as is shown), or otherwise positioned in use with the assembly body 30. Although many design configurations may exist with the assembly body 30 and the cable channel 40, it may be preferable to form the cable channel 40 integrally within the assembly body 30. This provides a structurally sound platform or holding area for the messenger cable when it is positioned on the assembly body 30.

The cable channel 40 may be sized large enough to receive the messenger cable efficiently. For example, the cable channel 40 may have an arced or circular interior surface which the messenger cable rests upon while it is within the cable channel 40. As is shown in FIG. 1, the cable channel 40 may have an elongated U-shaped cable holding area. The cable channel 40 may include sidewalls 42 which rise vertically above a bottom 44 of the cable channel 40. The sidewalls 42 may prevent the messenger cable from slipping out of the cable channel 40 during an installation process or during permanent retention of the messenger cable. The cable channel 40 may include other features to improve or optimize the use of the clamp 10. For instance, rounded or chamfered surfaces along the edges of the cable channel 40 may provided a lower resistance to the messenger cable as it is being inserted into the cable channel 40.

The assembly clamp 50 is a locking structure that is positioned proximate to the assembly body 30. As is shown in FIG. 1, the assembly clamp 50 may include one or more posts 52 that are inserted within a receiving structure 32. The posts 52 may have a threaded portion that is located at an end of the post 52 (discussed with respect to FIGS. 2-3), which may be used to retain the assembly clamp 50 proximate to the assembly body 30, but still allow movement of the assembly clamp 50. The receiving structures 32 may be sized larger than the posts 52 and allow the posts 52 to move in substantially only two directions: inserted into the receiving structures 32 or removed from the receiving structures 32. This allows for movement of the assembly clamp 50 in two directions, i.e., movement of the assembly clamp 50 between an open position and a closed position on the cable channel 40.

The assembly clamp 50 is used to retain the messenger cable within the cable channel 40 and clamp the messenger cable in place within the cable channel 40. During an initial installation of the messenger cable, the assembly clamp 50 is positioned over the cable channel 40 but not fully closed on the cable channel 40. In this position, there is sufficient space between the assembly clamp 50 and the cable channel 40 for an end of the messenger cable and pulling devices to be inserted within the cable channel 40 and pulled through the cable channel 40. However, the assembly clamp 50 is positioned close enough to the cable channel 40 to prevent the messenger cable from being dislodged from the cable channel 40. In other words, the messenger cable may move linearly through the cable channel 40, but it may be prevented from being radially dislodged from the cable channel 50. This position of the assembly clamp 50 may be achieved by retaining the posts 52 of the assembly clamp 50 within the receiving structures 32 of the assembly body 30. In this configuration, the messenger cable may be pulled through the clamp 10 during installation of the messenger cable.

Once the messenger cable is installed to the desired position, i.e., a position where the messenger cable is ready for indefinite installation, the assembly clamp 50 may be moved into the closed position. The closed position is a position where the messenger cable is biased between the assembly clamp 50 and the bottom 44 of the cable channel 40, such that the assembly clamp 50 and the cable channel 40 retain the messenger cable in a substantially stationary position preventing it from moving linearly within the cable channel 40. To achieve the closed position of the assembly clamp 50, the posts 52 may be retained within the receiving structures 32, thereby moving the assembly clamp 50 closer towards the bottom 44 of the cable channel 40. The messenger cable may be retained in this position for an indefinite period of time, including any number of months or years after installation of the messenger cable.

It is noted that, unlike conventional systems, the clamp 10 can be used for both installation and permanent retention of the messenger cable. During installation, the clamp 10 is configured to allow the messenger cable to be strung through the cable channel 40, and when the messenger cable reaches an appropriate position, the messenger cable may be locked in place with the assembly clamp 50. The use of the clamp 10 for both installation and permanent retention of the messenger cable may save substantial costs during installation of the utility lines, since the device for installing the messenger cable does not need to be removed and replaced with a permanent retention device. Additionally, the clamp 10 can be used with stringing and retaining the messenger cable along a path with many variations, including variations in the messenger cable path of upwards of 20° in the x, y, and z directions from a straight path of the messenger cable. This is a significant improvement over conventional devices that are only able to retain the messenger cable along a path of up to 6°, and allows for a single clamp 10 to be used in many situations where conventional devices cannot be used.

Any of the components of the clamp 10 may be constructed from any type of material, such as galvanized steel, aluminum, plastics, or other materials, or combinations thereof. Since the clamp 10 may be used for both installation of a cable as well as permanent or indefinite retention of a cable on the utility pole or other utility holding structure, the material that the clamp 10 is constructed from should preferably be resistant to inclement weather and degradation.

Figure 2:
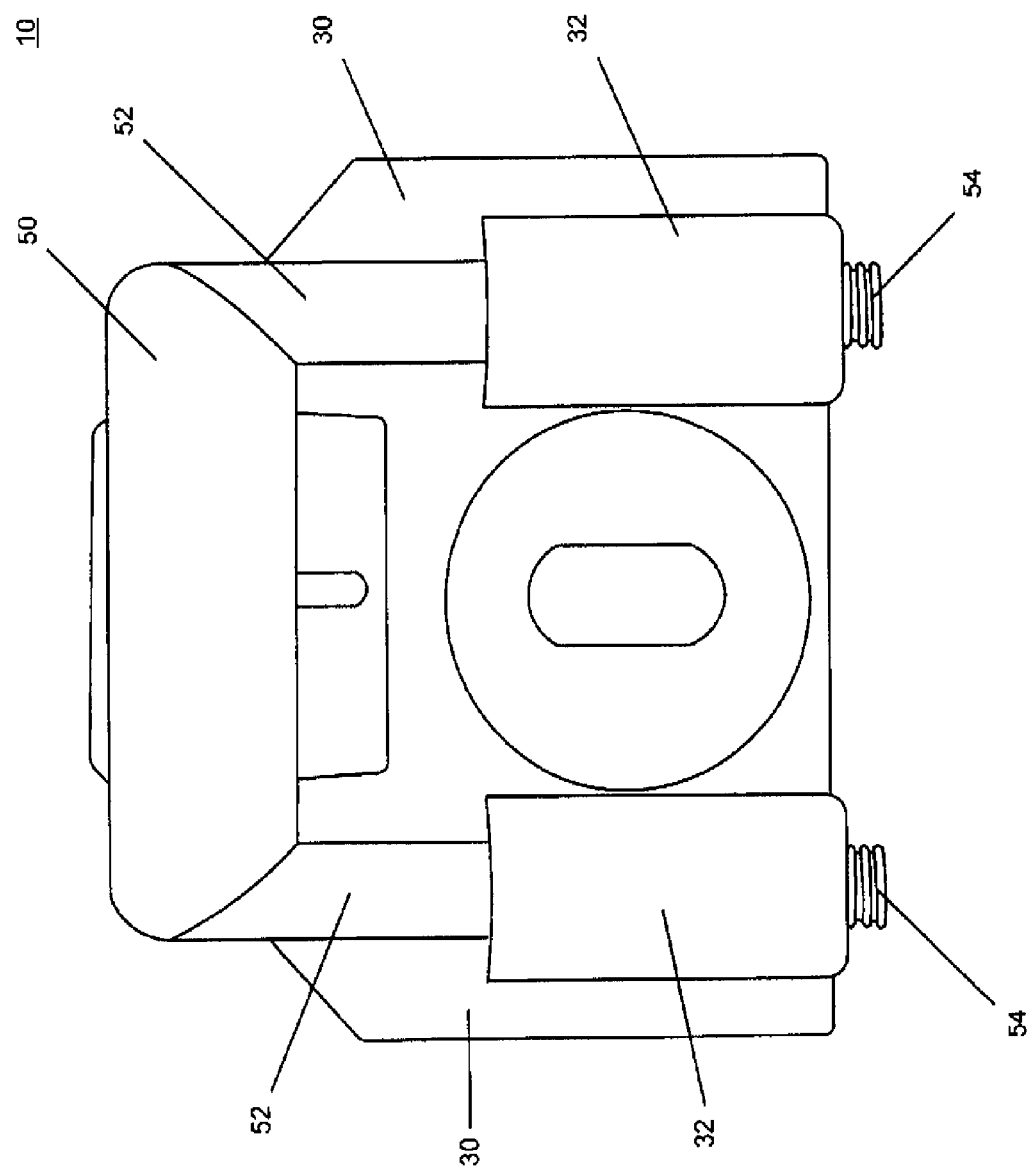
FIG. 2 is a rear view illustration of the assembly body and assembly clamp of the stringing messenger clamp, in accordance with the first exemplary embodiment of the present disclosure.

FIG. 2 is a rear view illustration of the assembly body 30 and assembly clamp 50 of the stringing messenger clamp 10, in accordance with the first exemplary embodiment of the present disclosure. In particular, FIG. 2 is an illustration of the clamp 10 without the bracket 20 affixed to the assembly body 30. As can be seen, the posts 52 of the assembly clamp 50 are positioned within the receiving structures 32. Each of the posts 52 includes at least one threaded portion 54, which can be used to retain the assembly clamp 50 in a connected position on the assembly body 30. For example, the threaded portions 54 may be sized to receive a threaded fastener (not shown), such as a nut. As the threaded fastener is screwed on the threaded portion 54 of the post 52, it may contact the receiving structure 32 of the assembly body 30. Further rotation of the threaded fastener on the threaded portion 54 will draw the assembly clamp 50 towards the receiving structures 32, thereby moving the assembly clamp 50 closer to the cable channel 40 (FIG. 1).

As one having skill in the art can see, when the threaded fastener is used with the threaded portions 54, the threaded portions 54 effectively engage with the receiving structures 32 of the assembly body 30. Additionally as can be seen, the threaded fasteners can be used to position the assembly clamp 50 in one of a plurality of clamping positions, such as a fully closed clamping position where the assembly clamp 50 is biased to contact the assembly body 30, or an installation clamping position. The installation clamping position may be characterized as a position where the assembly clamp 50 is movably retained proximate to the assembly body 30 with the threaded portion 54 engaged with the threaded fastener. In this position, the messenger cable may be linearly movable within the cable channel 40, yet prevented from being radially withdrawn from the cable channel 40.

Figure 3:
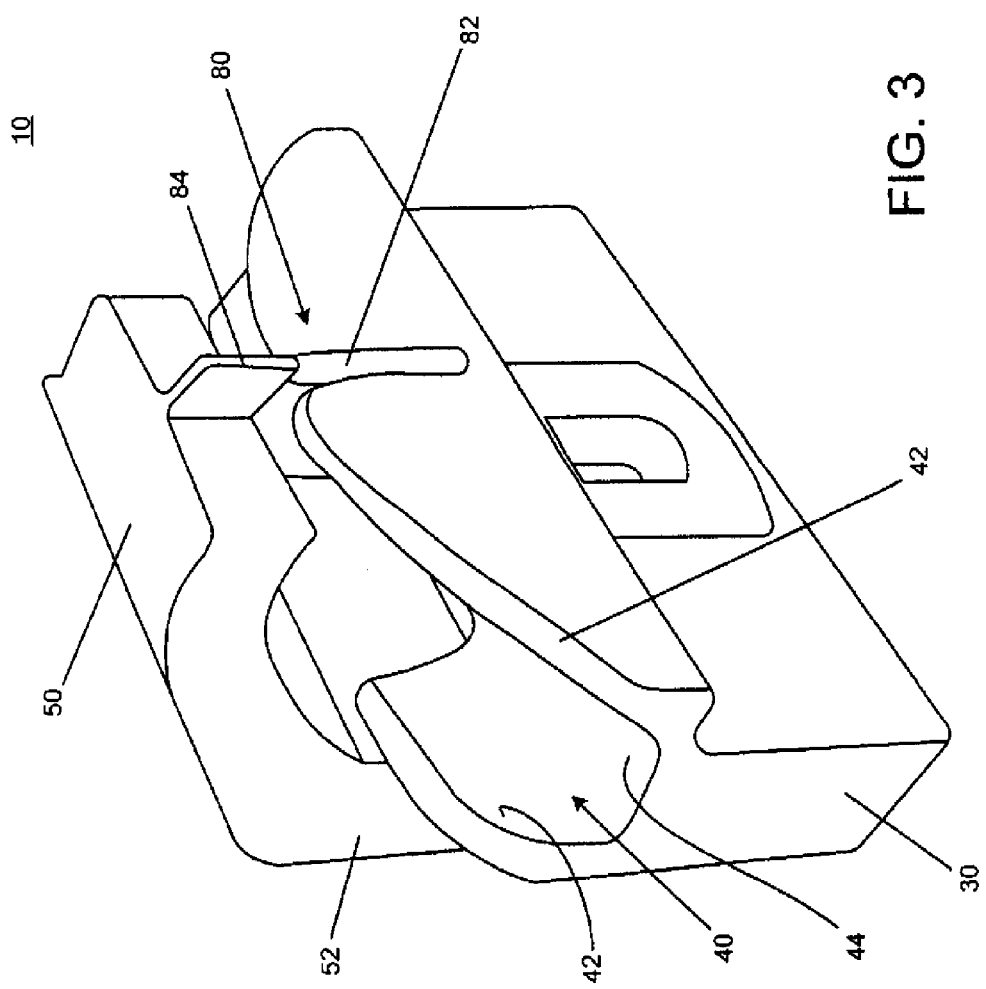
FIG. 3 is a plan view illustration of the stringing messenger clamp, in accordance with the first exemplary embodiment of the present disclosure.
Figure 4:
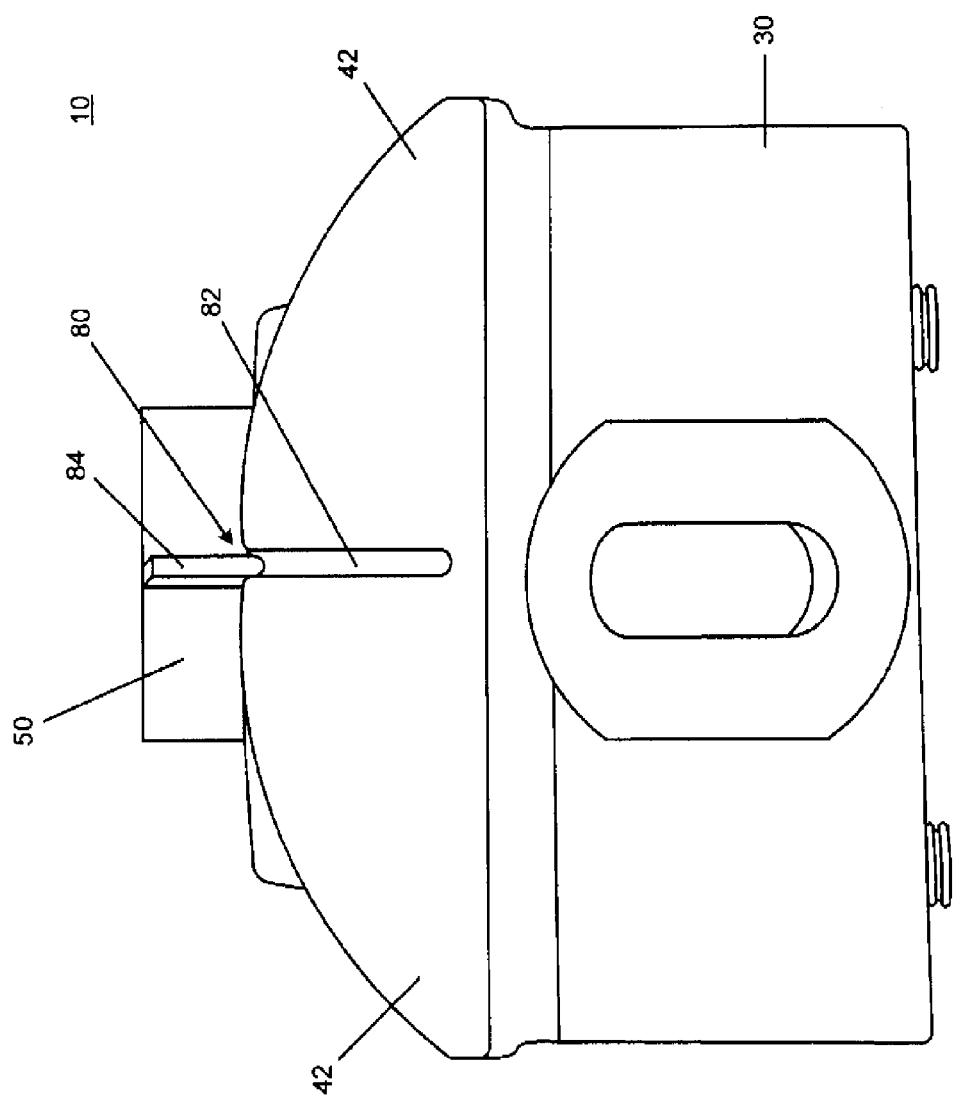
FIG. 4 is a front view illustration of the stringing messenger clamp, in accordance with the first exemplary embodiment of the present disclosure.

FIG. 3 is a plan view illustration of the stringing messenger clamp 10 and FIG. 4 is a front view illustration of the stringing messenger clamp 10, in accordance with the first exemplary embodiment of the present disclosure. With reference to both FIGS. 3-4, the clamp 10 may also include a slot and guide system 80 having a slot 82 and a guide structure 84. The slot 82 may be integrally formed within the assembly body 30 and the guide structure 84 may be integrally formed within the assembly clamp 50. The slot and guide system 80 may be used to guide the assembly clamp 50 from an open position of the cable channel 40 to a closed position of the cable channel 40. For example, as the messenger cable is being installed within the cable channel 40, the assembly clamp 50 may be in the installation position (FIG. 3). In this position, the slot and guide system 80 may lessen movement within the assembly clamp 50 from the moving messenger cable. As can be seen in FIG. 3, the guide structure 84 may be positioned above the slot 82, or partially within the slot 82.

When the messenger cable is positioned in an appropriate retention position, the guide structure 84 may be moved into the slot 82 as the assembly clamp 50 is moved towards the bottom 44 of the cable channel 40. FIG. 4 illustrates the slot and guide system 80 being moved into the closed position (but not fully in the closed position). For example, as is shown in FIG. 4, as the assembly clamp 50 is moved into the closed position, the guide structure 84 may be moved into the slot 82. As the assembly clamp 50 is moved further into the closed position, the guide structure 84 may be moved more into the slot 82. The positioning of the guide structure 84 within the slot 82 when the assembly clamp 50 is fully in the closed position may include the guide structure 84 being fully positioned within the slot 82, or positioned within the slot 82 substantially more than it is in the installation position.

It is noted that the slot and guide system 80 may include a plurality of other designs and configurations. For example, a plurality of slots 82 and a plurality of guide structures 84 may be included within the assembly body 30 and assembly clamp 50, respectively. Additionally, the tolerance between the slot 82 and the guide structure 84 may be selected based on various conditions of the clamp 10 to ensure that the assembly clamp 50 is guided correctly when it is moved into the closed position. Other variation, features, or functions may also be included, all of which are considered within the scope of the disclosure.

Figure 5:
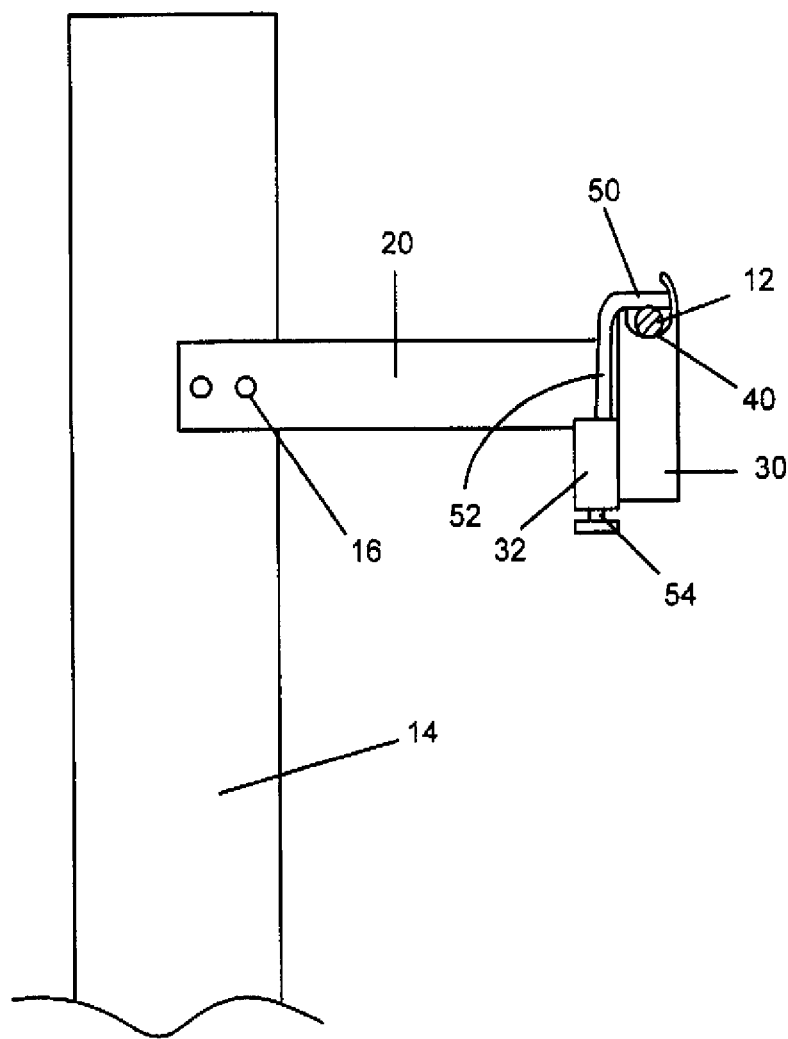
FIG. 5 is a side view illustration of the stringing messenger clamp retained on a utility holding structure, in accordance with the first exemplary embodiment of the present disclosure.

FIG. 5 is a side view illustration of the stringing messenger clamp 10 retained on a utility holding structure 14, in accordance with the first exemplary embodiment of the present disclosure. The utility holding structure 14 may include any type of structure that can hold a utility or transmission and/or distribution line, such as a wooden, metal, or composite utility pole. The utility holding structure 14 may also include a building, a tower, or other infrastructure that may be used to support a transmission and distribution line. As is shown in FIG. 5, the bracket 20 may be used to properly support the assembly body 30 and assembly clamp 50 in an aerial position on the utility holding structure 14, to support a messenger cable 12 positioned within the cable channel 40 of the assembly body 30. The bracket 20 may extend away from the utility holding structure 14 to hold the messenger cable a distance away from the utility holding structure 14. Accordingly, any transmission and distribution line that is strung from the messenger cable may also be held a distance away from the utility holding structure 14.

At least one connector 16 may be used to affix to the bracket 20 to the utility holding structure 14. The connector 16, which may be any type of bolt or fastening structure, may be used to securely fasten or affix the bracket 20 directly to the utility holding structure 14 (as is shown), or to a cross arm of the utility holding structure 14. The connector 16 may use any type of fastener or structure for engagement with a fastener. For example, the connector 16 may have a plurality of holes that a threaded fastener is inserted through. The threaded fastener may then be threaded into the cross arm, or otherwise engaged with the utility holding structure 14. Any number of connectors 16 may be used, such as two or more connecters 16 as is shown in FIG. 5. Many designs and variations to the clamp 10 and methods associated with using the clamp 10 may be available, all of which are considered within the scope of the present disclosure.

Figure 6:
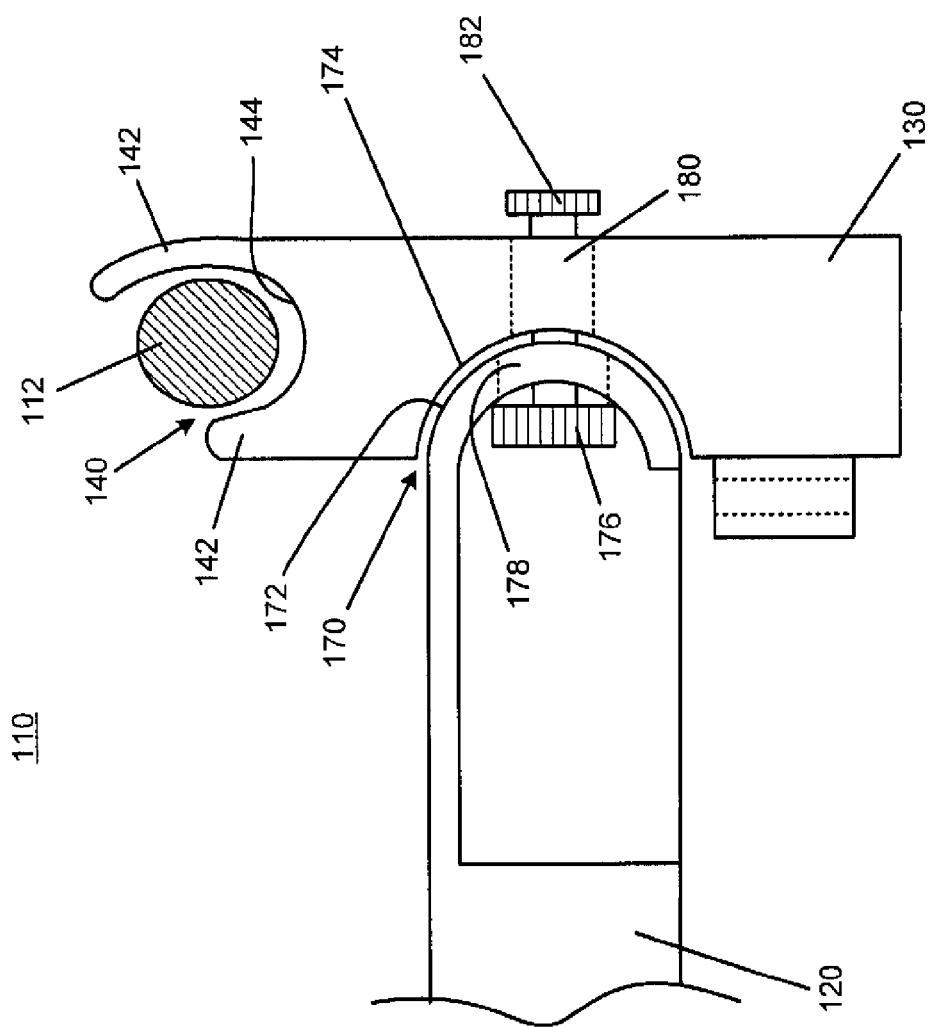
FIG. 6 is a cross-sectional side view illustration of a ball and socket system of a stringing messenger clamp, in accordance with a second exemplary embodiment of the present disclosure.

FIG. 6 is a cross-sectional side view illustration of a ball and socket system 170 of a stringing messenger clamp 110, in accordance with a second exemplary embodiment of the present disclosure. The stringing messenger clamp 110 of the second exemplary embodiment, which may be referred to herein as 'clamp 110,' may include any of the features, components, or functions discussed with respect to any of the other embodiments within this disclosure. The clamp 110 includes a bracket 120 and an assembly body 130 supported by the bracket 120. The assembly body 130 has a cable channel 140, having sidewalls 142 and a base 144, that are sized to receive a portion of a messenger cable 112. Similar to FIGS. 1-5 of the first exemplary embodiment and not shown in FIG. 6, the clamp 110 also includes an assembly clamp (not shown) is movable with respect to the assembly body 130 and closable upon the cable channel 140. In a closed position, the assembly clamp (not shown) retains in place the portion of the messenger cable 112 within the cable channel 140.

As is shown in FIG. 6, the bracket 120 may be connected to the assembly body 130 with a ball and socket joint 170. The ball and socket joint 170 may include a ball portion 172 on the bracket 120 and a socket portion 174 on the assembly body 130. The ball portion 172 may be sized to fit within and be received by the socket portion 174, thereby providing a secure connection between the bracket 120 and the assembly body 130. A threaded or non-threaded fastener 176 may be used to secure the ball portion 172 to the socket portion 174. As is shown in FIG. 6, the fastener 176 may traverse through a first hole 178 within the ball portion 172 and a second hole 180 within the socket portion 174 of the assembly body 130. A nut 182 may be used to secure the fastener 176 in place within the first and second holes 178, 180. The bracket 120 may have an opening therein which allows access to the fastener 176. The opening is preferably accessible via the underside of the bracket 120 when the bracket 120 is connected to a utility pole and in an in-use position.

The ball and socket joint 170 may allow for a plurality of static positions of the assembly body 130 with respect to the bracket 120, thereby providing a universal and adaptable clamp 110. For example, the ball and socket joint 170 may allow the assembly body 130 to be positioned radially in any number of varying degrees about the bracket 120. The fastener 176 and nut 182 may be used to secure the assembly body 130 in a specific position about the bracket 120. For example, either after or during installation of the messenger cable 112, the nut 182 may be loosened on the fastener 176 to allow for movement between the assembly body 130 and the bracket 120. An appropriate orientation of the assembly body 130 may be selected and the nut 182 may be tightened on the fastener 176. To allow for many degrees of varying positions, either one or both of the first and second holes 178, 180 may be sized larger than an exterior diameter of the fastener 176 to allow for movement of the fastener 176 within the ball and socket joint 170. For example, as is shown in FIG. 6, the first hole 178 in the ball portion 172 is sized larger than the second hold 180 in the socket portion 174, thereby allowing the fastener 176 to move within the ball and socket joint 170 and accommodate a number of positions of the assembly body. Many designs and variations to the clamp 110 and methods associated with using the clamp 110 may be available, all of which are considered within the scope of the present disclosure.

Figure 7:
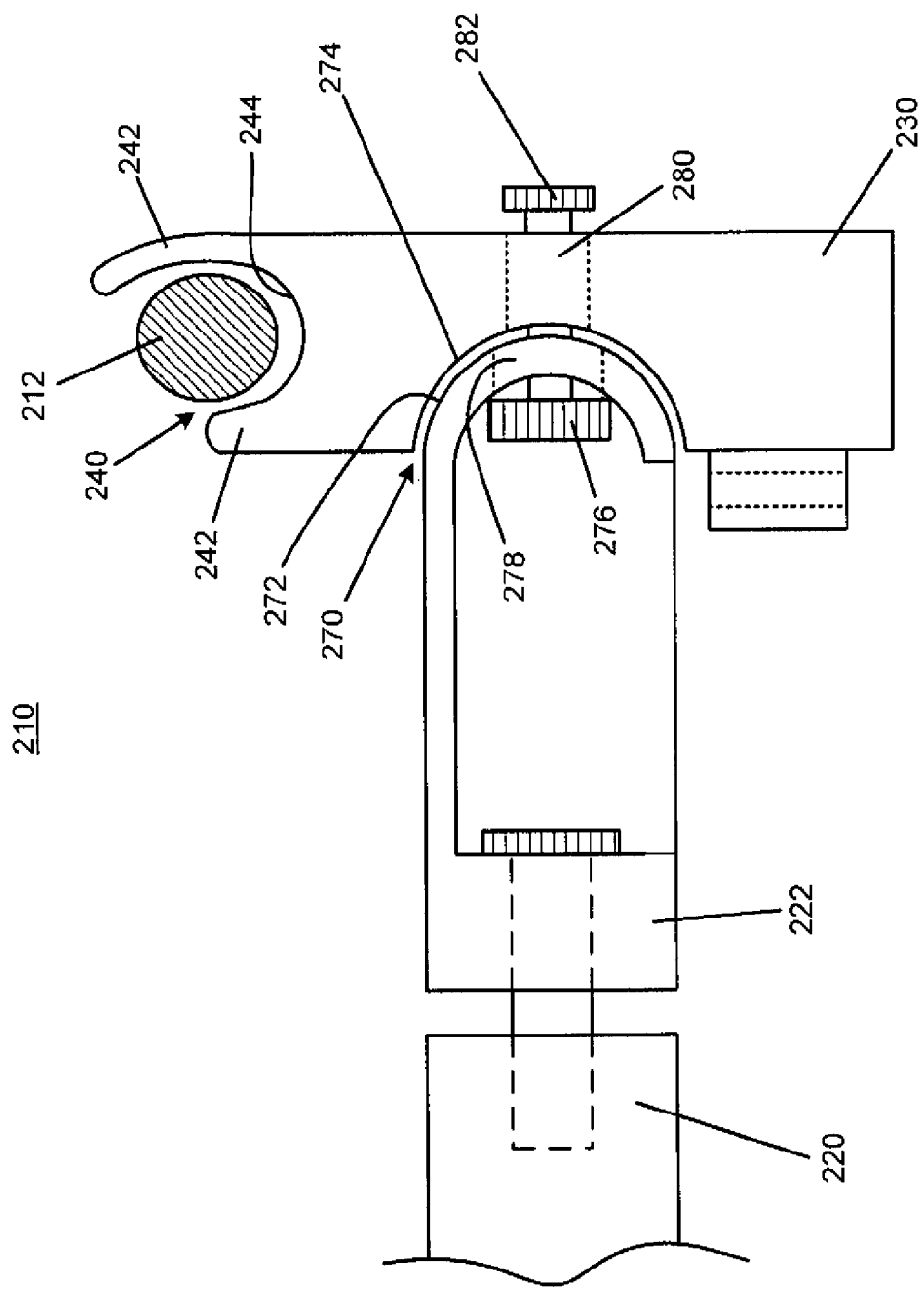
FIG. 7 is a cross-sectional side view illustration of a ball and socket system of a stringing messenger clamp, in accordance with a third exemplary embodiment of the present disclosure.

FIG. 7 is a cross-sectional side view illustration of a ball and socket system 270 of a stringing messenger clamp 210, in accordance with a third exemplary embodiment of the present disclosure. The stringing messenger clamp 210 of the second exemplary embodiment, which may be referred to herein as 'clamp 210,' may include any of the features, components, or functions discussed with respect to any of the other embodiments within this disclosure. The clamp 210 includes a bracket 220 and an assembly body 230 supported by the bracket 220. The assembly body 230 has a cable channel 240, having sidewalls 242 and a base 244, that are sized to receive a portion of a messenger cable 212. Similar to FIGS. 1-5 of the first exemplary embodiment, the clamp 210 also includes an assembly clamp (not shown) movable with respect to the assembly body 230 and closable upon the cable channel 240. In a closed position, the assembly clamp (not shown) retains in place the portion of the messenger cable 212 within the cable channel 240.

Similar to FIG. 6, the bracket 220 may be connected with a connecting structure 222 to the assembly body 230 and the ball and socket joint 270. The connecting structure 222 and bracket 220 may be removably connected together with a threaded fastener, or any other type of connection. This may allow the connecting structure 222 and the bracket 220 to be separated. The use of the connecting structure 222 may allow for easy installation of the system 210 by providing a connection point between the bracket 220, or another structure fixed to a utility pole, and the assembly body 230. The ball and socket joint 270 includes a ball portion 272 on a connecting structure 222 and a socket portion 274 on the assembly body 230. The ball portion 272 may be sized to fit within and be received by the socket portion 274, thereby providing a secure connection between the connecting structure 222 and the assembly body 230. A threaded or non-threaded fastener 276 may be used to secure the ball portion 272 to the joint portion 274. As is shown in FIG. 7, the fastener 276 may traverse through a first hole 278 within the ball portion 272 and a second hole 280 within the socket portion 274 of the assembly body 230. A nut 282 may be used to secure the fastener 276 in place within the first and second holes 278, 280. The connecting structure 222 may have an opening therein which allows access to the fastener 276. The opening is preferably accessible via the underside of the connecting structure 222 when the bracket 220 and connecting structure 222 are connected to a utility pole and in an in-use position.

Figure 8:
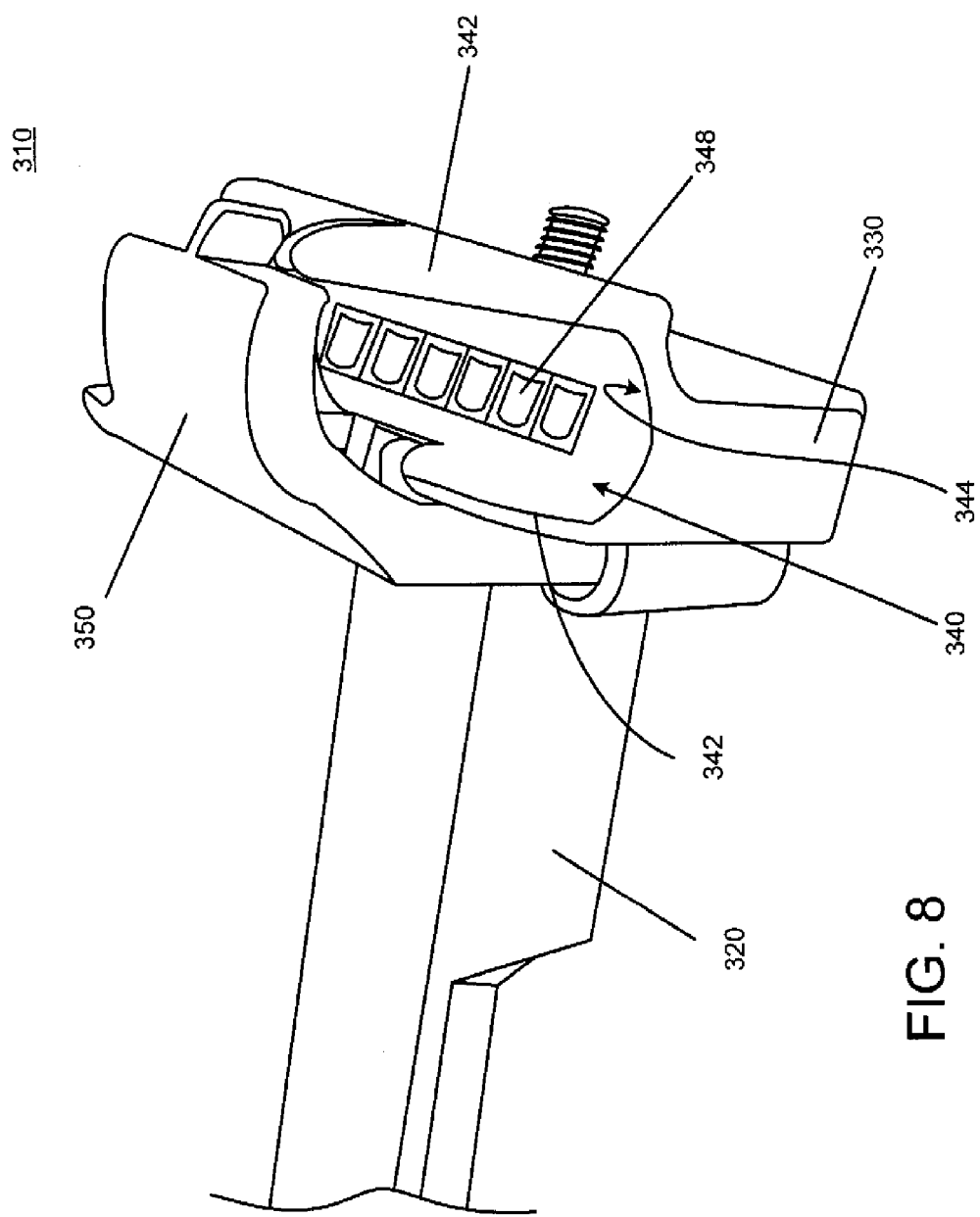
FIG. 8 is a plan view illustration of a stringing messenger clamp for overhead transmission and distribution systems, in accordance with a fourth exemplary embodiment of the present disclosure.

FIG. 8 is a plan view illustration of a stringing messenger clamp 310 for overhead transmission and distribution systems, in accordance with a fourth exemplary embodiment of the present disclosure. The stringing messenger clamp 310 for use in overhead transmission and distribution systems, referred to herein simply as 'clamp 310' may include any of the features, components, or functions discussed with respect to any of the other embodiments within this disclosure. The clamp 310 includes a bracket 320 and an assembly body 330 supported by the bracket 320. The assembly body 330 has a cable channel 340 sized to receive a portion of a messenger cable and pulling devices. An assembly clamp 350 is movable with respect to the assembly body 330 and closable upon the cable channel 340, wherein the assembly clamp 350 in a closed position retains in place the portion of the messenger cable within the cable channel 340.

The cable channel 340 is formed with a bottom 344 and sidewalls 342, which guide a cable through the cable channel 340. As is shown in FIG. 8, the cable channel 340 may also include one or more rollers 348 or other low friction devices positioned within the bottom 344 and/or sidewalls 342 of the cable channel 340. The rollers 348 may include any type of rolling structure that helps guide or move the cable through the cable channel 340. For example, the rollers 348 may include cylindrical structures that rotate about an axis, where a surface of the rollers 348 is approximately level with or offset with the surface of the cable channel 340. This may allow the cable to contact the surface of the rollers 348 while it is moving through the cable channel 340, and the rollers 348 may lessen the friction of the cable moving through the cable channel 340. It is noted that the rollers 348 may be positioned within any part of the cable channel 340, including the bottom 344 or the sidewalls 342. Furthermore, other structures or materials may be used with the rollers 348, or in place of the rollers 348. This may include structures such as spherical bearings, and/or low-friction materials.

Figure 9:
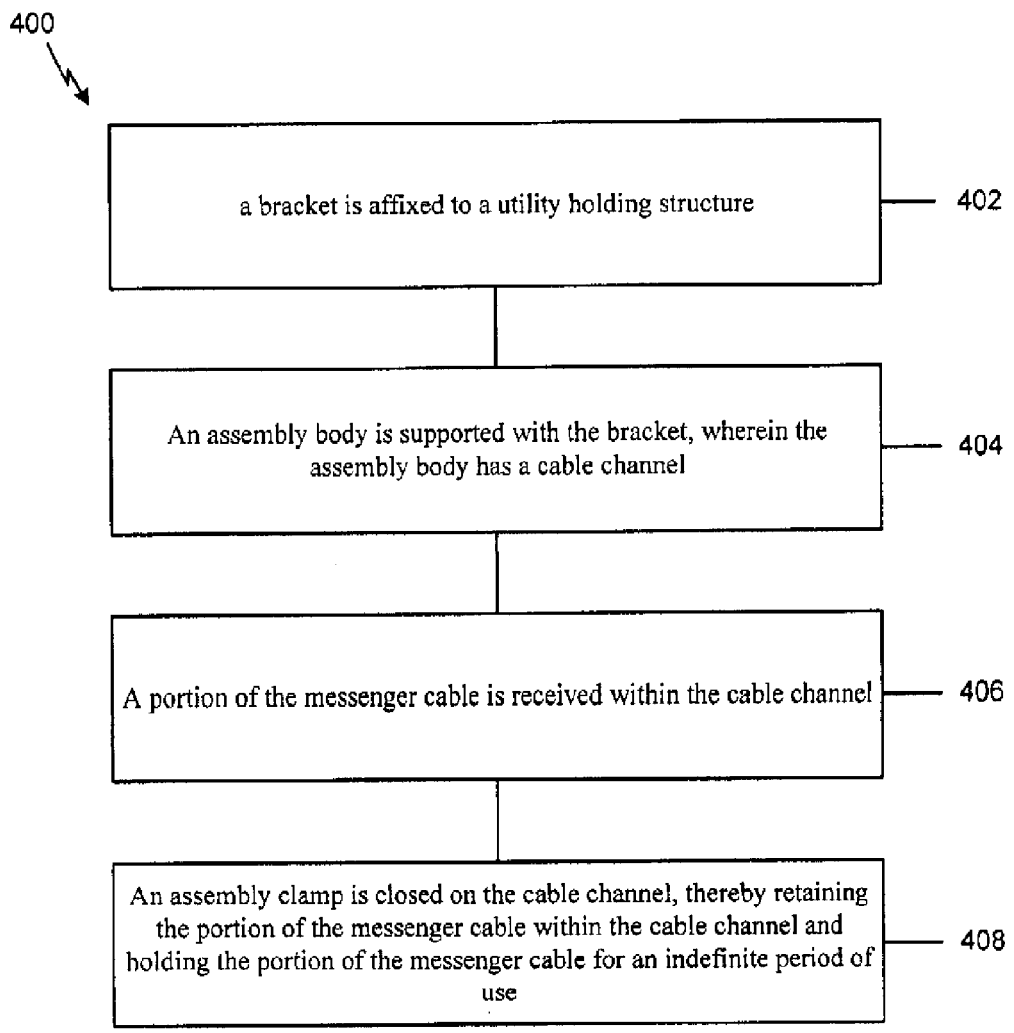
FIG. 9 is a flowchart illustrating a method of stringing and retaining a messenger cable, in accordance with a fifth exemplary embodiment of the disclosure.

FIG. 9 is a flowchart 400 illustrating a method of stringing and retaining a messenger cable, in accordance with a fifth exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 402, a bracket is affixed to a utility holding structure. An assembly body is supported with the bracket, wherein the assembly body has a cable channel (block 404). A portion of the messenger cable is received within the cable channel (block 406). An assembly clamp is closed on the cable channel, thereby retaining the portion of the messenger cable within the cable channel and holding the portion of the messenger cable for an indefinite period of use (block 408).

Any number of additional steps or variations thereof may be included with the method, including any of the functions, structures, and/or components discussed in any of the embodiments within this disclosure. For example, the step of supporting an assembly body with the bracket may include affixing the assembly body to the bracket with a ball and socket joint. The assembly body may be positioned in one of a plurality of static positions with respect to the bracket by adjusting the ball and socket joint. The assembly clamp may be retained in a connected position on the assembly body with at least one threaded portion on the assembly clamp. For example, the at least one threaded portion may be used to place the assembly clamp in an installation position, whereby the assembly clamp is movably retained within a predetermined distance of the assembly body with the threaded portion. This positioning may prevent the assembly clamp from moving beyond the predetermined distance, thereby retaining the messenger cable within the cable channel. When the messenger cable is being strung within the cable channel, the positioning of the messenger cable within the cable channel may change as the messenger cable is linearly moved through the cable channel. This can be done while the assembly clamp is in the installation position, where the assembly clamp is partially retained proximate to the assembly body with the threaded portion, which prevents the messenger cable from being withdrawn from the cable channel.

To assist with closing the cable channel, the assembly clamp may be guided over the cable channel with a slot and guide system. The slot and guide system may have a slot integrally formed within the assembly body and a guide structure integrally formed within the assembly clamp. The guide structure may be positioned within the slot when the assembly clamp is in a closed position. As has been noted previously, the stinging messenger clamp may be used for both installation of the messenger cable and for permanently retaining the messenger cable in place for an indefinite period of time. This may include holding the portion of the messenger cable for an indefinite period of use, such as holding the portion of the messenger cable during a post-installation period of use. These steps, and any number of additional steps or variations thereof, may be repeated throughout the method.

Figure 10:
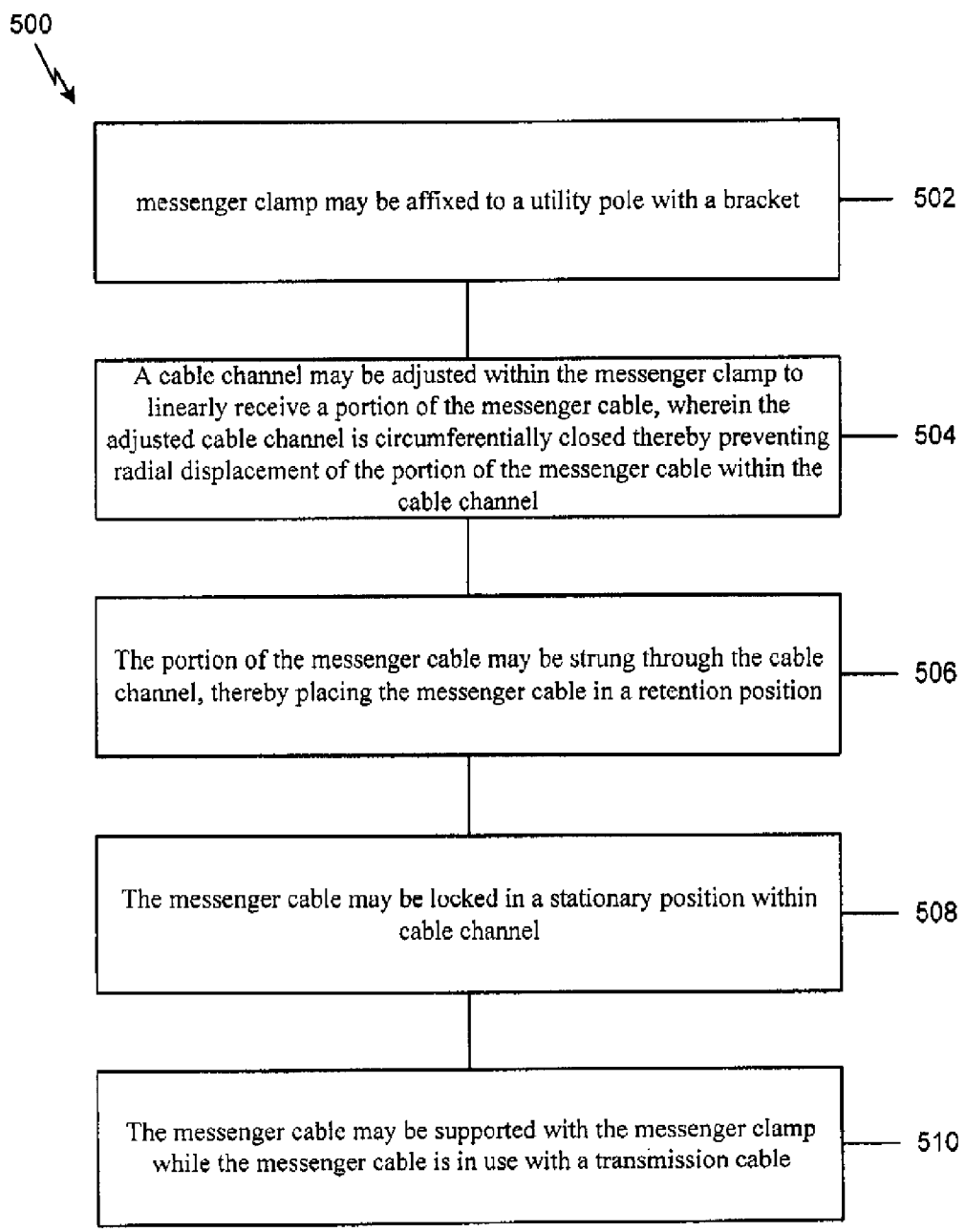
FIG. 10 is a flowchart illustrating a method of installing a messenger cable, in accordance with a sixth exemplary embodiment of the disclosure.

FIG. 10 is a flowchart 500 illustrating a method of installing a messenger cable, in accordance with a sixth exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 502, messenger clamp may be affixed to a utility pole with a bracket. A cable channel may be adjusted within the messenger clamp to linearly receive a portion of the messenger cable, wherein the adjusted cable channel is circumferentially closed thereby preventing radial displacement of the portion of the messenger cable within the cable channel (block 504). The portion of the messenger cable may be strung through the cable channel, thereby placing the messenger cable in a retention position (block 506). The messenger cable may be locked in a stationary position within cable channel (block 508). The messenger cable may be supported with the messenger clamp while the messenger cable is in use with a transmission cable (block 510). Any number of additional steps or variations thereof may be included with the method, including any of the functions, structures, and/or components discussed in any of the embodiments within this disclosure. For example, the messenger clamp may be positioned in one of a plurality of static positions by manipulating a ball and socket joint connected between the messenger clamp and the bracket. These steps, and any number of additional steps or variations thereof, may be repeated throughout the method.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A stringing messenger clamp for overhead transmission and distribution systems, the stringing messenger clamp comprising:
   a bracket;
   an assembly body supported by the bracket, wherein the assembly body has a cable channel sized to receive a portion of a messenger cable;
   an assembly clamp movable with respect to the assembly body and closable upon the cable channel, wherein the assembly clamp in a closed position retains in place the portion of the messenger cable within the cable channel;
   at least one threaded portion on the assembly clamp, wherein the at least one threaded portion on a first side of the cable channel and retains the assembly clamp in a connected position on the assembly body via at least one fastener configured to mate with the threaded portion;
   a slot and guide system having a slot formed through a sidewall of the cable channel and a guide structure integrally formed within the assembly clamp, wherein the slot and guide structure are positioned on a second side of the cable channel, wherein the second side substantially opposes the first side; and
   a ball and socket joint positioned between the bracket and the assembly body, the ball and socket joint having a ball portion and a socket portion, wherein a fastener is positioned through a first aperture defined in the ball portion and a second aperture defined in the socket portion, wherein one of the ball portion and the socket portion is formed in the assembly body, and
   wherein the bracket includes an inner portion, a pocket defined in the inner portion and a side access opening giving access to the pocket, wherein an axial length of the fastener is less than an axial length of the pocket, and wherein the pocket is adapted to allow insertion of the fastener through the first aperture defined through the ball portion and the second aperture defined through the socket portion.

2. The stringing messenger clamp of claim 1, wherein the bracket and the assembly body are connected through the ball and socket joint in one of a plurality of static positions.

3. The stringing messenger clamp of claim 1, wherein the fastener further comprises a threaded fastener and a threaded nut, wherein the threaded fastener extends through the assembly body, wherein the assembly body is positioned between the threaded nut and the bracket.

4. The stringing messenger clamp of claim 1, wherein the at least one threaded portion engages with the assembly body.

5. The stringing messenger clamp of claim 4, wherein the at least one threaded portion on the assembly clamp further comprises two threaded portions on the assembly clamp, wherein the fastener positioned through the ball portion through the socket portion is located between the two threaded portions.

6. The stringing messenger clamp of claim 1, wherein the at least one threaded portion provides a plurality of clamping positions for the assembly clamp, wherein one of the plurality of clamping positions includes an installation position where the assembly clamp is partially retained proximate to the assembly body with the at least one threaded portion to prevent the messenger cable from being withdrawn from the cable channel, and wherein the messenger cable is linearly movable within the cable channel.

7. The stringing messenger clamp of claim 1, wherein the guide structure is positioned within the slot when the assembly clamp is in the closed position, wherein the guide structure is positioned at least partially between two portions of the sidewall of the assembly body.

8. The stringing messenger clamp of claim 1, further comprising at least one roller positioned within the cable channel, wherein a surface of the at least one roller is offset from a surface of the cable channel.

9. A method of stringing and retaining a messenger cable comprising the steps of:
   affixing a bracket to a utility holding structure;
   supporting an assembly body with the bracket with a ball and socket joint, wherein the ball and socket joint has a ball portion and a socket portion, wherein a fastener is positioned through a first aperture defined in the ball portion and is positioned through an aperture defined in the socket portion, wherein one of the ball portion and the socket portion is formed in the assembly body, wherein the assembly body has a cable channel, wherein the bracket includes an inner portion, a pocket defined in the inner portion and a side access opening giving access to the pocket, wherein an axial length of the fastener is less than an axial length of the pocket, and wherein the pocket is adapted to allow insertion of the fastener through the first aperture defined through the ball portion and the second aperture defined through the socket portion;
   receiving a portion of the messenger cable within the cable channel; closing an assembly clamp on the cable channel by engaging at least one threaded portion of the assembly clamp to the assembly body, the at least one threaded portion positioned on a first side of the cable channel;
   guiding the assembly clamp over the cable channel with a slot and guide system, wherein the slot and guide system has a slot formed through a sidewall of the assembly body and a guide structure integrally formed within the assembly clamp, wherein the slot and guide structure are positioned on a second side of the cable channel, wherein the second side substantially opposes the first side; and retaining the portion of the messenger cable within the cable channel and holding the portion of the messenger cable for an indefinite period of use.

10. The method of stringing and retaining the messenger cable of claim 9, wherein the step of supporting an assembly body with the bracket further comprises the step of:

positioning assembly body in one of a plurality of static positions with respect to the bracket with the ball and socket joint.

11. The method of stringing and retaining the messenger cable of claim 9, further comprising the step of adjusting a positioning of the portion of the messenger cable by moving the messenger cable linearly through the cable channel while the assembly clamp is in an installation position, wherein in the installation position, the assembly clamp is partially retained proximate to the assembly body with at least one threaded portion to prevent the messenger cable from being withdrawn from the cable channel.

12. The method of stringing and retaining the messenger cable of claim 11, wherein in the installation position, the assembly clamp is movably retained within a predetermined distance of the assembly body with the at least one threaded portion, wherein the at least one threaded portion prevents the assembly clamp from moving beyond the predetermined distance.

13. The method of stringing and retaining the messenger cable of claim 9, further comprising step of guiding the assembly clamp over the cable channel with a slot and guide system, wherein the slot and guide system has a slot formed through a sidewall of the assembly body and a guide structure integrally formed within the assembly clamp.

14. The method of stringing and retaining the messenger cable of claim 9, wherein the step of holding the portion of the messenger cable for an indefinite period of use further comprising holding the portion of the messenger cable during a post-installation period of use.

15. A method of installing a messenger cable comprising the steps of:

affixing a messenger clamp to a utility pole with a bracket, the messenger clamp having at least two descending threaded portions connected together at a ceiling;

adjusting a cable channel within the messenger clamp to linearly receive a portion of the messenger cable, wherein the adjusted cable channel is circumferentially closed thereby preventing radial displacement of the portion of the messenger cable within the cable channel, and wherein a guide structure formed on a side face of the ceiling of the messenger clamp is at least partially positioned within a slot formed laterally through a sidewall of the cable channel;

stringing the portion of the messenger cable through the cable channel, thereby placing the messenger cable in a retention position;

locking the messenger cable in a stationary position within the cable channel; and supporting the messenger cable with the messenger clamp while the messenger cable is in use with a transmission cable.

16. The method of installing a messenger cable of claim 15, further comprising the step of positioning the messenger clamp in one of a plurality of static positions by manipulating a ball and socket joint connected between the messenger clamp and the bracket.

17. A stringing messenger clamp for overhead transmission and distribution systems, the stringing messenger clamp comprising:

a bracket;

an assembly body supported by the bracket, wherein the assembly body has a cable channel sized to receive a portion of a messenger cable;

an assembly clamp movable with respect to the assembly body and closable upon the cable channel, wherein the assembly clamp in a closed position retains in place the portion of the messenger cable within the cable channel, the messenger clamp having at least two descending threaded portions connected together at a ceiling;

at least two descending threaded portions connected together at a ceiling on the assembly clamp, wherein the at least two descending threaded portions on a first and second side of the cable channel, respectively retain the assembly clamp in a connected position on the assembly body via at least two fasteners; and a slot and guide system having a slot formed through a sidewall of the cable channel and a guide structure integrally formed within the assembly clamp, wherein the slot and guide structure are positioned on a second side of the cable channel, the guide structure is formed on the side face of the ceiling of the messenger clamp, wherein the second side substantially opposes the first side.

* * * * *